United States Patent [19]
Möller

[11] Patent Number: 5,993,119
[45] Date of Patent: Nov. 30, 1999

[54] DRILL HAVING COOLING CHANNEL AND CHIP FLUTES

[75] Inventor: Claes Möller, Norrköping, Sweden

[73] Assignee: Seco Tools AB, Fagersta, Sweden

[21] Appl. No.: 09/065,538

[22] Filed: Apr. 24, 1998

[51] Int. Cl.⁶ .............................. B23B 51/06; B23B 51/02
[52] U.S. Cl. .............................. 408/57; 408/59; 408/229; 408/230
[58] Field of Search .............................. 408/57, 59, 229, 408/230; 407/11

[56] References Cited

U.S. PATENT DOCUMENTS

| Re. 24,924 | 1/1961 | Willingham | 408/59 |
|---|---|---|---|
| 4,558,975 | 12/1985 | Hale | 408/223 |

FOREIGN PATENT DOCUMENTS

| 1646711 | 5/1991 | Russian Federation | 408/59 |

Primary Examiner—Steven C. Bishop
Attorney, Agent, or Firm—Burns, Doane, Swecker & Mathis, L.L.P.

[57] ABSTRACT

A drill for metal chip-removing machining includes a shank which defines a longitudinal axis of rotation and has front and rear ends. The front end carries cutting edges defined by respective inserts. Two chip flutes extend rearwardly from respective cutting edges for conducting chips. A cooling channel includes a main portion extending through the shank between the two chip flutes. At a location spaced from the front end of the shank, the main portion of the cooling channel splits into two branch portions which terminate in the front end of the shank. The main portion of the cooling channel is arranged such that a center axis thereof lies parallel to, and radially offset from, the axis of rotation, and such that the axis of rotation lies within the main portion of the cooling channel.

10 Claims, 2 Drawing Sheets

DRILL HAVING COOLING CHANNEL AND CHIP FLUTES

TECHNICAL FIELD OF THE INVENTION

The present invention relates to a drill for chip removing machining.

PRIOR ART

Such drills are known which include a shank, two chip flutes, and a cooling channel. The shank has a tip forming front end with at least two cutting edges, and an opposed rear end. The cutting edges are formed by an indexible central insert and an indexible peripheral insert, respectively. The chip flutes extend from the front end to the rear end of the shank. The cooling channel is situated between the chip flutes, and a main portion of the channel lies parallel to a center axis of the shank and extends through the drill shank from the rear end towards the front end between the chip flutes. A front end of the main portion branches into two branch portions, each of which terminate in the front end to conduct cooling fluid to the cutting edges.

Drills of the above-captioned type are used for chip removing machining and especially for drilling holes in metallic work pieces. During the machining, chips are produced at the front end of the drill shank, and are transported within the cooling fluid from the front end of the shank to the rear end of the drill shank with the chip flutes.

As a prior art drill of the above-captioned type, it is known to subdivide the main portion of the cooling channel into two branch portions before the cooling channel reaches the front end of the drill. These two branch portions consequently open into the front end at a distance from the axis of rotation of the drill. The center axis of the main portion of the cooling channel thereby normally coincides with the center axis of the drill. However, it has been found that with such a design of the drill, the depth of the chip flute of the central insert is too shallow for certain areas of applications for the drill. The chips generated by the central insert have a tendency to assume a circular shape, and therefore the depth of the associated chip flute should somewhat exceed the diameter of the circular chip.

OBJECTS AND SUMMARY OF THE INVENTION

One object of the present invention is to provide a drill of the above-captioned type where a simple production of the drill is combined with an adequate transport of the chips in the chip flutes, said transport being performed by means of a cooling medium, preferably a liquid coolant, which is supplied via the cooling channel and returned via the chip flutes.

Another object of the present invention is that the design of the chip flutes and the main portion of the cooling channel located between the chip flutes, shall be such that the strength of the drill is not reduced as compared to known drills.

The objects of the present invention are realized by a drill for metal chip removing machining. The drill comprises a shank defining a longitudinal axis of rotation and including front and rear ends. The front end carries cutting edges. Two chip flutes are formed in an outer periphery of the shank and extend rearwardly from the front end for conducting chips cut by respective cutting edges. A cooling channel includes a main portion extending forwardly through the shank from the rear end and is disposed between the two chip flutes. The main portion terminates short of the front end. The cooling channel includes two branch portions diverging from a front end of the main portion and terminating in the front end of the shank. The main portion of the cooling channel is arranged such that a center axis thereof lies parallel to, and radially offset from, the axis of rotation. The cooling channel is further arranged such that the axis of rotation lies within the main portion of the cooling channel.

The thicknesses of the portions of the shank disposed between the main portion of the cooling channel and the respective chip flutes are substantially constant along the entire length of the main portion of the cooling channel. Those thicknesses are preferably substantially equal to one another.

Preferably, each of the chip flutes extends helically and forms a helix angle of 5 to 7.5 degrees with the axis of rotation.

The shank preferably includes a longitudinal length L and a diameter D, wherein L is equal to, or less than, three times D, and a total helical twist of each of the chip flutes along the shank is about 30 degrees.

Preferably, the main portion of the cooling channel has a diameter of 14–20% of a diameter of the shank.

The two cutting edges are preferably formed by a central cutting insert and a peripheral cutting insert, respectively. A chip flute associated with the central insert has a portion of circular shape when viewed in cross-section.

A chip flute associated with the peripheral insert preferably has a floor and side walls arranged substantially parallel to one another. It is also preferable that such flute has a cross-sectional width which is about one-half of a diameter of the shank.

BRIEF DESCRIPTION OF THE DRAWINGS

The objects and advantages of the invention will become apparent from the following detailed description of a preferred embodiment thereof in connection with the accompanying drawings, in which like numerals designate like elements, and in which.

DETAILED DESCRIPTION OF A PREFERRED EMBODIMENT OF THE INVENTION

Figure 1:
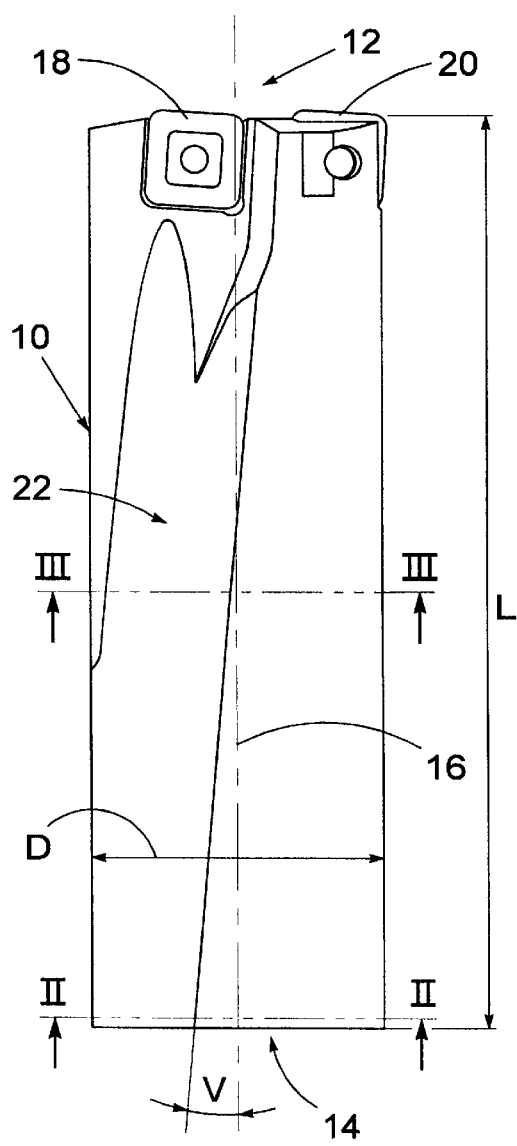
FIG. 1 shows a side view of a shank of a drill according to the invention.

The shank 10 of a drill shown in FIG. 1 according to the present invention has a tip forming front end 12 and an opposed rear end 14, which is adapted to be connected to a holder (not shown). The holder is adapted to be inserted in an adapter (not shown) of a machine tool. The shank 10 has a longitudinal center axis 16, which also constitutes the axis of rotation of the drill. The shank 10 has a substantially constant diameter D along its entire length. The rotational direction of the drill is depicted by the arrow 17 in FIG. 3.

A central insert 18 and a peripheral insert 20 (partly hidden) are provided at the tip forming front end 12 of the shank 10. The cutting inserts 18, 20 are preferably identical and exchangeable. Chips cut by the inserts are conducted along chip flutes (to be described). There can be one or more inserts per chip flute.

In the shown embodiment two chip flutes 22, 24 (only the flute 22 being shown in FIG. 1) extend helically from the front end 12 to the rear end 14 where the chip flutes 22, 24 terminate by extending radially outwardly to the outer periphery of the shank 10. As shown in FIG. 1, the chip flute 22 has a certain positive helix angle v. A preferred value of said angle v lies within the interval of 5°–7.5°. The chip flute 24 (not shown in FIG. 1) has just as great a helix angle v. In this connection it shall be noted that within the limits of the invention it is possible to employ a negative helix angle with reference to the same rotational direction, see the arrow 17. A negative helix angle is advantageous for vibrational dampening of the drill 10.

Each chip flute 22, 24 has a cross-sectional shape which is substantially constant along the entire length L of the shank 10.

The drill according to the invention is preferably intended for so called short hole drills where the length L of the shank relates to the shank diameter D (see FIG. 1) as follows: L<3×D. In such a short hole drill according to the present invention the total helical twist of each flute over the entire length L of the shank 10 is about 30° if a suitable helix angle v is chosen within the above-identified range.

Figure 2:
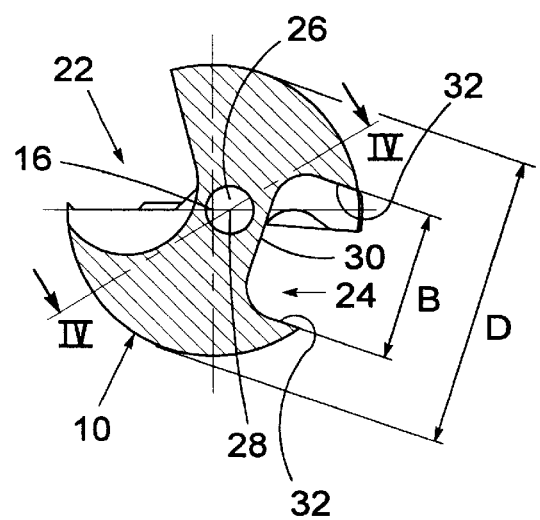
FIG. 2 shows a section along II—II in FIG. 1.
Figure 3:
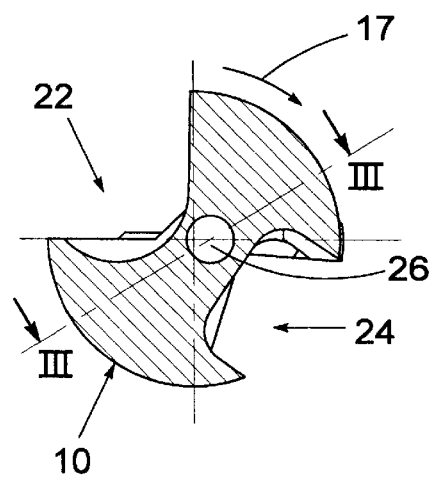
FIG. 3 shows a section along III—III in FIG. 1.
Figure 4:
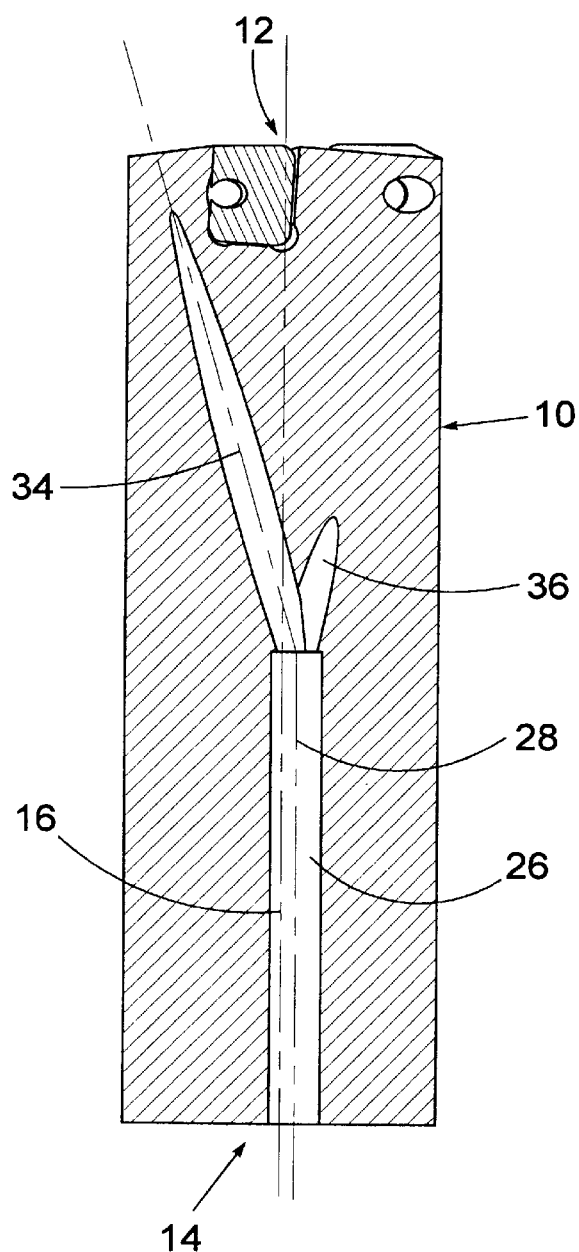
FIG. 4 shows a section along IV—IV in FIG. 2.

As shown in FIGS. 2–4, a main portion of the cooling channel 26 located between the chip flutes runs along a part of the length L of the shank 10 between the flutes, said main portion extending forwardly from the rear end 14 of the shank 10 for about one-half of the length L of the shank 10. The cooling channel 26 also extends rearwardly through the holder (not shown) and terminates in a rear free end of holder. The main portion of the cooling channel 26 located between the chip flutes extends parallel to, and offset from, the central axis 16 of the shank 10. See FIGS. 2–4 where it is clearly shown that a center axis 28 of the cooling channel 26 is located beside the center axis 16 of the shank 10.

Preferably, the main portion of the cooling channel 26 also extends parallel to, and offset from, the central axis 16 of the shank 10 in the not shown holder, the offset distance being the same as in the shank 10, i.e., the main portion of the cooling channel 26 runs rectilinearly through both the shank 10 and the holder.

By comparing FIGS. 2 and 3 it is evident that despite the fact that the main portion of the cooling channel 26 extends rectilinearly through the shank 12 between the chip flutes while the chip flutes 22, 24 are helically twisted in the axial direction of the shank 10, the thicknesses T, T' of the portions of the shank material between the main portion of the cooling channel 26 and respective chip flutes 22, 24 are constant and substantially equal. The chip flutes 22, 24 thus extend helically, and the center axis 28 of the cooling channel 26 is located between the chip flutes along a twist center. By having a constant thickness of the shank material between the channel 26 and the respective chip flutes, as well as a constant thickness between the flutes themselves, the drill is highly rigid. In this connection shall be pointed out that the cross section of the main portion of the cooling channel 26 located between the chip flutes cannot be made too small since then unreasonable demands are put on the feed force of the coolant. A preferred relationship according to the present invention is that the diameter of the main portion of the cooling channel 26 located between the chip flutes constitutes 14–20% of the diameter D of the shank 10.

From FIGS. 2–4 is evident that the eccentricity of the cooling channel 26 is such that the central axis 16 of the shank 10 is located in the main portion of the cooling channel 26. It is perceived that the main portion of the cooling channel 26 cannot have an excessively large eccentricity, since then the depth of the chip flute 24 of the peripheral insert 20 would have to be too shallow. This will be discussed further below.

In the shown embodiment the main portion of the cooling channel 26 is eccentrically displaced such that the depth of the chip flute 22 for the central insert 18 is larger than the depth of the chip flute 24 for the peripheral insert 20. It is generally known that the chips C from the central insert 22 are circularly shaped while the chips C' from the peripheral insert 24 have a trapezoidal contour, see FIG. 5. The dimensions of the chips depend to a large extent on the cutting geometry of the tip forming end 12, and therefor one can calculate in an empirical way the maximal chip dimensions which a certain drill will generate. This knowledge is then used for dimensioning the chip flutes 22, 24.

Figure 5:
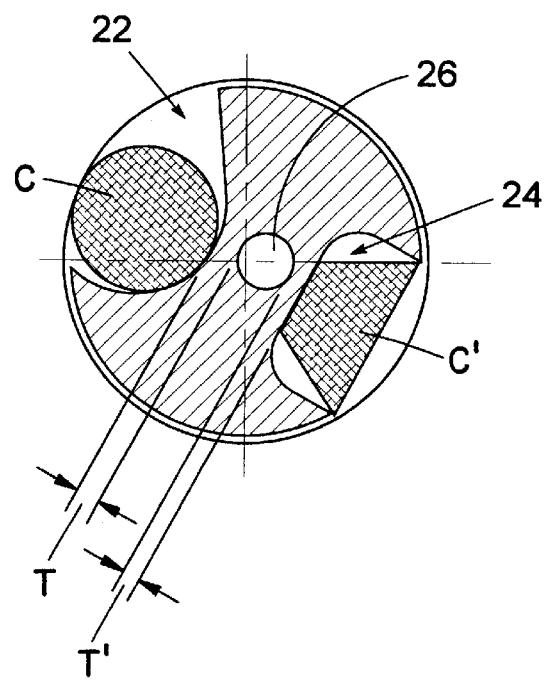
FIG. 5 schematically shows a transverse section through of the drill shank where chip profiles and a bore wall are shown.

As illustrated in FIG. 5 it is important that the chip flute 22 for the central insert 18 has a depth which provides space in the chip flute 22 for the circularly shaped chips cut by the central insert 18. In a corresponding manner the chip flute 24 for the peripheral insert 20 has a cross sectional area which to the utmost possible extent is adapted to the normal trapezoidal contour of the chips cut by the peripheral insert 20.

From FIGS. 2 and 3 is evident that the chip flute 24 has a substantially planar bottom 30 and planar side-walls 32. The side-walls 32 are essentially parallel with each other. The side-walls 32 and the bottom 30 are connected to each other via softly rounded transitions. The relationship between the width B of the chip flute 24 and the diameter D of the shank 10 is preferably: B≈0.5D. Through a study of FIG. 5 it can be seen that the chip flute 24 has, in a striking manner, been adapted to the trapezoidal shape of the chip. Due especially to the parallel relationship of the side-walls of the chip flute 24, only a minimum of shank material has been removed at the periphery of the shank 10 to form the flute 24, which is advantageous for the drill rigidity.

As most clearly shown in FIG. 3, the main portion of the cooling channel 26 divides into two branch portions 34 and 36, which extend from the main portion of the cooling channel 26 to the tip forming front end 12, into which said branch portions 34 and 36 open. The branch portion 36, which terminates closest to the peripheral insert 20 also opens into the jacket (peripheral) surface of the shank 10, which however is not shown in FIG. 3.

The invention is preferably, but not exclusively, intended for helix drills, i.e., it is possible to apply the invention also on drills having straight chip flutes.

Although the present invention has been described in connection with a preferred embodiment thereof, it will be appreciated by those skilled in the art that additions, deletions, modification, and substitutions not specifically described may be made without departing from the spirit and scope of the invention as defined in the appended claims.

What is claimed is:

1. A drill for metal chip removing machining, comprising a shank defining a longitudinal axis of rotation and including front and rear ends, the front end carrying cutting edges of equal length, two chip flutes formed in an outer periphery of the shank and extending rearwardly from the front end for conducting chips cut by respective cutting edges; a cooling channel including a main portion extending forwardly through the shank from the rear end and disposed between the two chip flutes; the main portion terminating short of the front end; the cooling channel including two branch portions diverging from a front end of the main portion and terminating in the front end of the shank; the main portion of the cooling channel arranged such that a center axis thereof lies parallel to, and radially offset from, the axis of rotation and such that the axis of rotation lies within the main portion of the cooling channel.

2. A drill according to claim 1 wherein the thicknesses of portions of the shank disposed between the main portion of the cooling channel and the respective chip flutes are substantially constant along the entire length of the main portion of the cooling channel.

3. A drill according to claim 2 wherein the thicknesses are substantially equal to one another.

4. A drill according to claim 1 wherein each of the chip flutes extends helically and forms a helix angle of 5°–7.5° with the axis of rotation.

5. A drill according to claim 4 wherein the shank includes a longitudinal length L and a diameter D, wherein $L \leqq 3D$, and a total helical twist of each of the chip flutes along the shank is about 30°.

6. A drill according to claim 4 wherein the main portion of the cooling channel has a diameter of 14–20% of a diameter of the shank.

7. A drill according to claim 1 wherein the cutting edges are formed by a central cutting insert and a peripheral cutting insert, respectively, a chip flute associated with the central insert having a portion of circular shape when viewed in cross section.

8. A drill according to claim 1 wherein a first of the cutting edges is located closer to the axis of rotation than is a second of the cutting edges, the chip flute associated with the first cutting edge being of greater depth than the chip flute associated with the second cutting edge.

9. A drill for a chip removing machining, comprising a shank defining a longitudinal axis of rotation and including front and rear ends, the front end carrying cutting edges; two chip flutes formed in an outer periphery of the shank and extending rearwardly from the front end for conducting chips cut by respective cutting edges; a cooling channel including a main portion extending forwardly through the shank from the rear end and disposed between the two chip flutes; the main portion terminating short of the front end; the cooling channel including two branch portions diverging from a front end of the main portion and terminating in the front end of the shank; the main portion of the cooling channel arranged such that a center axis thereof lies parallel to, and radially offset from, the axis of rotation and such that the axis of rotation lies within the main portion of the cooling channel, wherein the cutting edges are formed by a central cutting insert and a peripheral cutting insert, respectively, a chip flute associated with the peripheral insert having a floor and side walls arranged substantially parallel to one another.

10. A drill according to claim 9 wherein the chip flute associated with the peripheral insert has a cross sectional width which is about one-half of a diameter of the shank.

* * * * *